UNITED STATES PATENT OFFICE.

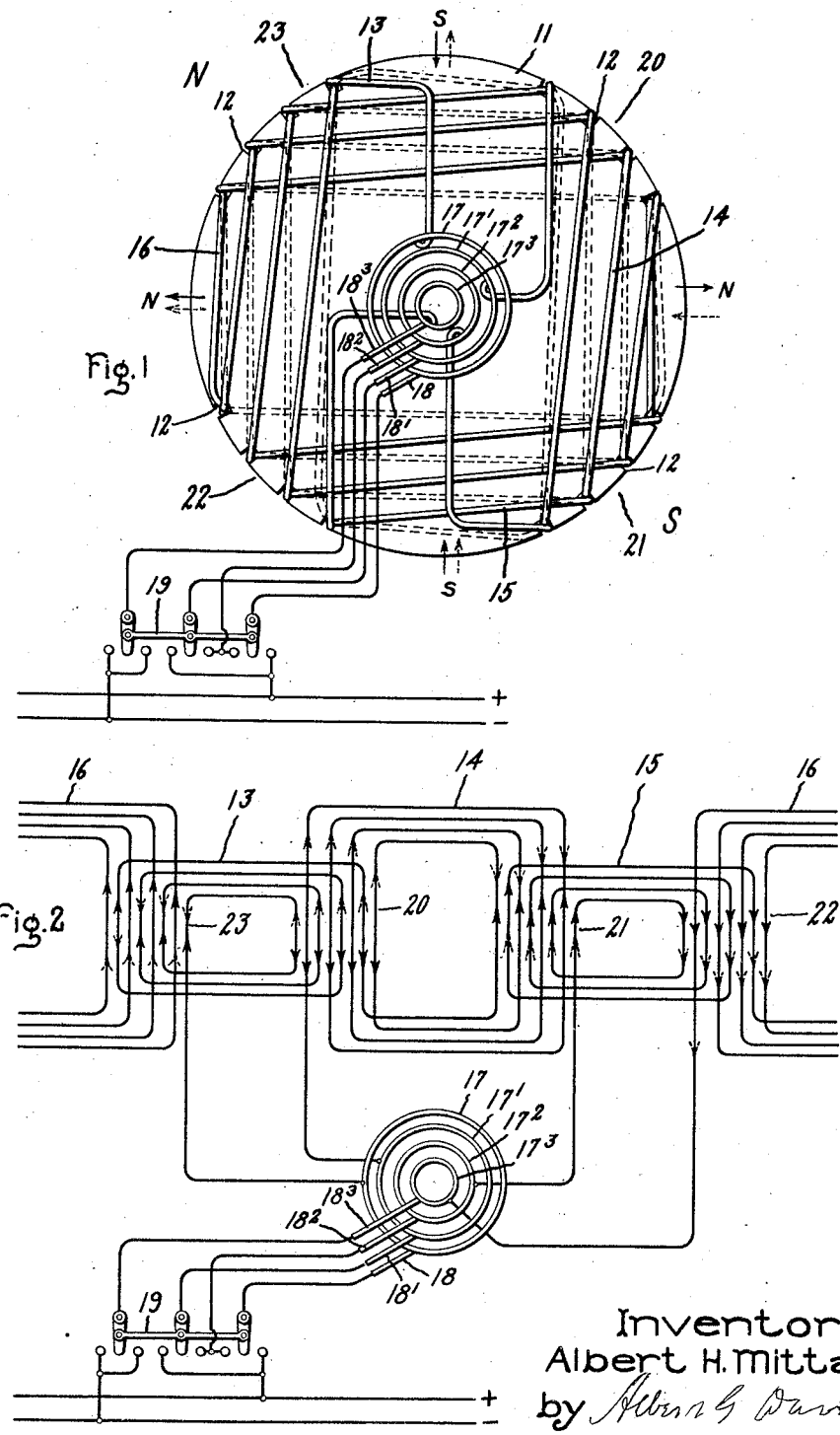

ALBERT H. MITTAG, OF SCHENECTADY, NEW YORK, ASSIGNOR TO GENERAL ELECTRIC COMPANY, A CORPORATION OF NEW YORK.

DYNAMO-ELECTRIC MACHINE.

1,423,958.  Specification of Letters Patent.  Patented July 25, 1922.

Application filed March 29, 1920. Serial No. 369,483.

*To all whom it may concern:*

Be it known that I, ALBERT H. MITTAG, a citizen of the United States, residing at Schenectady, county of Schenectady, State of New York, have invented certain new and useful Improvements in Dynamo-Electric Machines, of which the following is a specification.

My invention relates to dynamo electric machines and more particularly to synchronous alternating current apparatus, supplying a system of distribution at varying frequencies.

In general, my invention consists in so arranging the field exciting windings on a dynamo electric machine that they may be made to operate with more than one number of poles, such for example as $n$ or $\frac{n}{2}$ poles.

In systems requiring a varying frequency, such for example as ship propulsion systems where the speed of the propeller motors is largely dependent on the frequency of the source, such machines operating as alternators are especially advantageous, since it is possible by this means to vary the frequency of a system which of course is directly dependent on the pole member of the alternator, without varying its speed. Thus the prime mover, such as a steam turbine, may be operated at its efficient high speed. In alternators hitherto suggested which are adapted to operate with varying pole numbers, the windings have been arranged on definite poles on the rotor; due to this feature a poor flux distribution is obtained when the winding produces a pole number which varies from the normal. In my invention in order to secure a good flux distribution and other advantages I utilize a round rotor structure, having no definite poles, in which the windings for the excitation are arranged in slots in the magnetic core. I furthermore arrange the exciting windings in the slots in a novel way, so that the flux distribution from the poles is still further improved.

My invention may be understood by reference to the accompanying drawings, in which Fig. 1 shows the rotor or revolving field member and switching means for varying the number of poles produced thereon; and Fig. 2 is a development thereof, showing more clearly how the conductors for the exciting windings are arranged.

Referring now more in detail to the drawings, in which like reference characters refer to like parts throughout, the magnet core 11 is made up in any appropriate fashion of magnetic material and secured to a shaft 60 adapted to be driven by a prime mover. The slots 12 in the core are arranged in a plurality of groups 20, 21, 22 and 23, the number of groups depending on the maximum number of poles induced on the rotor. Located within slots 12 are a plurality of exciting windings 13, 14, 15 and 16. These exciting windings are shown in the figure as made up of a limited number of conductors in each slot, but it is to be understood that any number of turns may be used in accordance with the requirements of the alternator. The arrangement of the exciting windings is plain from an inspection of Fig. 1. Direct current busses, marked plus and minus, are adapted to supply the excitation windings 13, 14, 15 and 16 with current through the switching device 19, stationary brushes 18, $18^1$, $18^2$, and $18^3$, and collector rings 17, $17^1$, $17^2$, and $17^3$. One terminal of each exciting winding is connected to one of the collector rings and the switching device 19 is so arranged that when it is thrown toward the right, four magnetic poles are induced on the rotor, while if the switching device 19 be thrown to the left, two poles only are induced on the rotor. When the switching device 19 is thrown to the right, the exciting current flows through the exciting windings 13 and 14 in the direction shown by the full arrows on Fig. 2. It is to be noted that in the group of slots 20, which carry conductors of both exciting windings 13 and 14, all of the conductors carry current in the same direction. From exciting winding 14 the exciting current flows through the collector ring $17^1$ and brush $18^1$, then through one of the switch blades, through brush $18^2$ and collector ring $17^2$, through the winding 15 in the direction shown by the full arrow. From exciting winding 15 the current flows through winding 16 in the direction shown by full arrows through the collector ring $17^3$ to the stationary brush $18^3$ to the other side of the line. What was stated relative to the group of slots 20 carrying conductors from exciting windings 13 and 14, is likewise true of the group of slots 21, 22, and 23, all of the conductors in each group carrying current in the same direction. The result is that the exciting windings induce polarities shown by the small solid arrows in Fig. 1 and labeled respectively SN SN, as we progress from winding 13 around to 16. It is evident that this condition gives rise to a four-polar machine.

Now to obtain a smaller pole number, the switching member 19 is thrown to the left. The directions of the current flow through the various exciting windings 13, 14, 15 and 16 are shown in Fig. 2 by the dotted arrows thereon. From inspection of this figure it is evident that in the group of slots designated 23 and 21 the effect of the current due to conductors belonging to one of these exciting windings is nullified by the effect of the conductors in the adjacent exciting windings. In the other two groups of slots, 20 and 22, the dotted arrows all point in the same way. The pole producing effects of these windings are now illustrated by the dotted arrows in Fig. 1. The combined effect of these dotted arrows is bi-polar as is designated by the large capital letters N and S displaced from the vertical axis by 45°. For this smaller number of poles the conductors carried by the groups of slots 21 and 23 produce no disturbing effect whatsoever upon the flux distribution from pole to pole. This is due to the fact that pairs of conductors carrying currents in opposite directions are superposed in each of the slots in these groups and there can thus be no pole producing effect in a radial direction. In round rotors as hitherto built, with the conductors of each exciting winding placed in an individual group of slots, the production of disturbing magnetic poles when operating with the fewer poles cannot be eliminated as in the type of rotor invented by me.

Although a four and two-polar rotor is shown, it is evident that the same scheme may be utilized for any other number of poles. While I have shown in the accompanying drawing the preferred embodiment of my invention, it is not limited thereto, and I aim to cover in the appended claims all modifications falling fairly within the scope of my invention.

What I claim as new and desire to secure by Letters Patent of the United States, is—

1. In a dynamo electric machine, a field member comprising a magnetic core, a plurality of distributed exciting windings adapted to be connected to a source of direct current, and arranged in slots in said core, each of said slots carrying conductors belonging to two adjacent exciting windings, and means for varying the number of poles produced on said field member by reversing the direction of current flow in alternate pairs of exciting windings.

2. In a dynamo electric machine, a field member comprising a magnetic core $n$, distributed exciting windings adapted to be supplied from a source of direct current and arranged in slots in said core, each of said slots carrying conductors belonging to adjacent exciting windings, means for reversing the direction of current flow in alternate pairs of exciting windings, whereby the number of poles produced may be made either $n$ or $\frac{n}{2}$.

3. In a dynamo electric machine, a field member comprising a magnetic core, a plurality of distributed exciting windings adapted to be connected to a source of direct current and arranged in slots in said core, said slots carrying conductors from more than one of said exciting windings, means for reversing the direction of current flow in alternate pairs of exciting windings, for changing the number of poles produced by said winding, the conductors in the slots being so distributed that no disturbing magnetic poles can be formed between adjacent conductors of the exciting windings.

In witness whereof, I have hereunto set my hand this 27th day of March, 1920.

ALBERT H. MITTAG.